(No Model.)
O. ANDERSON & F. J. STETTER.
CARPET STRETCHER.
No. 434,103.  Patented Aug. 12, 1890.
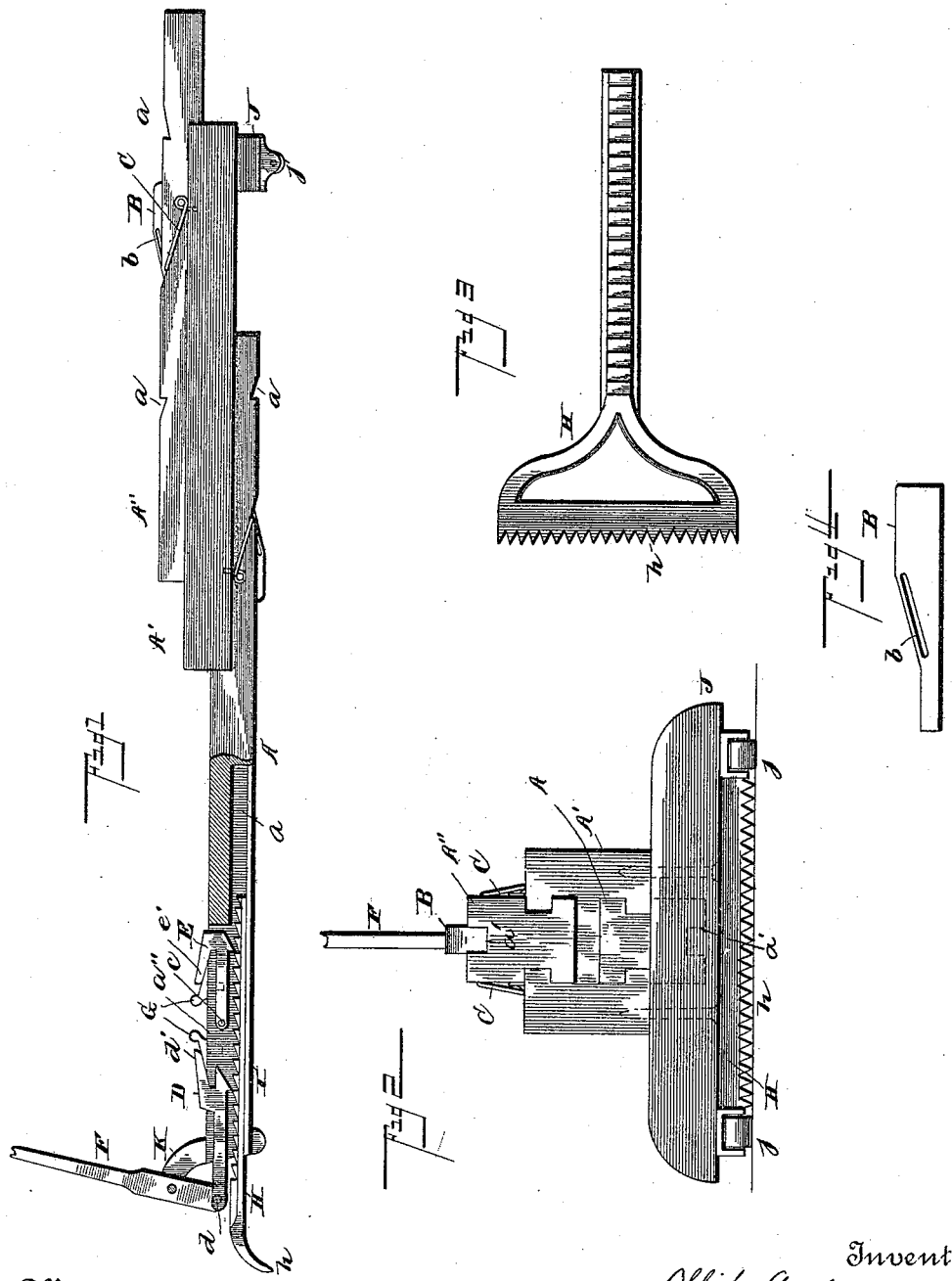
Witnesses
John Imrie
Thos. E. Robertson
Inventors
Ollof Anderson
Frank J Stetter
By T. J. W. Robertson
Attorney

UNITED STATES PATENT OFFICE.

OLLOF ANDERSON AND FRANK J. STETTER, OF DEFIANCE, OHIO.

CARPET-STRETCHER.

SPECIFICATION forming part of Letters Patent No. 434,103, dated August 12, 1890.

Application filed April 19, 1890. Serial No. 348,599. (No model.)

*To all whom it may concern:*

Be it known that we, OLLOF ANDERSON and FRANK J. STETTER, citizens of the United States, residing at Defiance, in the county of Defiance and State of Ohio, have invented certain new and useful Improvements in Carpet-Stretchers, of which the following is a specification, reference being had therein to the accompanying drawings.

This improvement relates to that class of carpet-stretchers comprising extension-bars sliding one over the other and provided with a sliding claw operated by a lever; and the invention consists in the peculiar construction, arrangement, and combination of parts hereinafter described, and then definitely claimed, whereby a carpet-stretcher is provided that is not only cheaply made and durable in use, but will be found to be light to handle and easy and sure in operation.

In the accompanying drawings, Figure 1 is a side elevation of a carpet-stretcher constructed according to our improvement; Fig. 2, an end view of the same; Fig. 3, a plan of the claw detached, and Fig. 4 is an elevation of a key.

Referring now to the details of the drawings by letter, A A' A'' represent three bars made of the shape in cross-section, (shown in Fig. 2,) so as to slide on each other. The upper and lower bars are each notched, as shown at $a$, and each has a groove $a'$, in which slides a key B, having a slot $b$. Attached to the central piece A' are two springs C, each of which passes through slot $b$ in the key B adjacent to it. The forward end of the bar A is slotted at $a''$ to receive the dog D and pawl E, the former of which is pivoted at $d$ to a lever F, pivoted to standards K, rising from each side of the bar A, to which they may be secured in any convenient manner. The pawl E is pivoted at $e$ to the bar A, and both it and the dog D have projecting ears $d'$ and $e'$, under which work turn-buttons G, which when turned one way will raise the dog and pawl, and when turned the other way will allow the said dog and pawl to fall into action. At the forward end of the bar A is the claw H, having a toothed arm $h$, and working in the groove $a'$, which is closed at the bottom by the plate I, so as to securely hold the arm $h$ of the claw H in said groove. Attached to the bar A' is a foot J, provided with rollers $j$.

When it is desired to use this stretcher, the bars are run out to make the stretcher as long as necessary to touch the base-board on one side of the room, when the springs C, falling into the notches $a$, prevent the bars closing together. The claw H is then pressed on the carpet and the buttons G turned to allow the dog and pawl to drop into the teeth of the bar $h$. Then by operating the handle the dog D pulls out the bar $h$ and then forces the claw H outward and stretches the carpet, the pawl E at the same time slipping over and falling into the teeth on the bar $h$, thus retaining it during the return motions of the handle, and holding the bar while the carpet is being nailed to the floor. When the carpet has been secured at one point, the buttons G are turned under the ears of the dog and pawl, thus raising them out of the notches of the bar $h$ and allowing the claw to be retracted, when the stretcher is ready for removal to the next point to be stretched.

To allow of the bars composing the stretcher being closed together to store it away, the keys B are pushed along in the groove, which, owing to the inclined position of the slots $b$, will raise the springs C out of the notches $a$ and the bars will then slide together, occupying but little space.

What we claim as new is—

1. The combination, in a carpet-stretcher, of a grooved and notched bar A with the bar A', the spring C, and the slotted key B, sliding in a groove in bar A and operating-spring C, substantially as described.

2. The carpet-stretcher herein described, comprising the bars A A' A'', the sliding keys B, the spring C, engaging in notches in the bars A A'', the dog D, pawl E, lever F, pivoted to the dog D, the turn-buttons G, acting on the dogs D and pawl E, the claw H, having toothed bar $h$, the plate I under said bar $h$, the foot J on the bar A', and the standards K, all substantially as described and shown.

In testimony whereof we affix our signatures, in presence of two witnesses, this 14th day of April, 1890.

OLLOF ANDERSON.
FRANK J. STETTER.

Witnesses:
R. H. GLEASON,
J. I. HALE.